United States Patent [19]

Recca et al.

[11] 4,053,949
[45] Oct. 11, 1977

[54] TELEPHONE SYSTEM AND METHOD FOR PROVIDING DIRECTORY ASSISTANCE/INTERCEPT INFORMATION

[76] Inventors: Frank A. Recca, 6217 Lenneal Beach Drive, Orlando, Fla. 32810; David J. Winter, 3218 Castle Oak Ave., Orlando, Fla. 32808

[21] Appl. No.: 681,035

[22] Filed: Apr. 28, 1976

[51] Int. Cl.² .................... G06F 15/16; G06F 15/40; H04M 3/60
[52] U.S. Cl. .............................. 364/200; 179/27 FG
[58] Field of Search ................. 340/172.5; 179/27 FG

[56] References Cited

U.S. PATENT DOCUMENTS

| 2,899,503 | 8/1959 | Dubuar | 179/27 FG X |
|---|---|---|---|
| 2,925,472 | 2/1960 | Pharis | 179/27 FG X |
| 2,968,700 | 1/1961 | Myers | 179/27 FG |
| 3,346,853 | 10/1967 | Koster et al. | 340/172.5 |
| 3,586,780 | 6/1971 | Kezuka | 179/27 FG X |
| 3,854,124 | 12/1974 | Comstock et al. | 340/172.5 |

*Primary Examiner*—Raulfe B. Zache
*Attorney, Agent, or Firm*—Duckworth, Hobby & Allen

[57] ABSTRACT

A system for use with a plurality of directory assistance or intercept telephone operator positions, in which each position has means for monitoring a plurality of line conductor pairs and includes first and second units for storing data representative of the status of a plurality of telephone numbers. A keyboard is collocated with the operator position for addressing either storage unit with respect to a given telephone number, and an output device, such as a cathode ray tube, is collocated with the operator's position and the addressing means for receiving an output from the storage unit and providing an indication of the status of the telephone number. The operator, or alternatively a number translator, operates between each line pair and the keyboard for providing an input to the addressing means representative of each called telephone number through the corresponding line pair. A switch is also provided between all of the keyboard-cathode ray tube combinations and both storage units for switching each combination between the first and second units. A circuit is also included for entering charging information for directory assistance calls.

19 Claims, 2 Drawing Figures

TELEPHONE SYSTEM AND METHOD FOR PROVIDING DIRECTORY ASSISTANCE/INTERCEPT INFORMATION

BACKGROUND OF THE INVENTION

1. Field of the Invention

The present invention relates to telephony, and in particular relates to systems and methods which are used to provide information to an intercept and/or directory assistance operator as to the status of a plurality of subscriber telephone numbers.

2. Description of the Prior Art

Printed telephone directories currently used by telephone companies in the United States and Canada are usually prepared on an annual basis. During any yearly period, a large number of subscribers in any telephone company's area receive new telephone numbers, as they move into that company's area. Since such changes cannot be found in the annual printed directory, telephone utilities are required to provide a service known as "directory assistance," in which the calling party can dial a code, usually a three-digit number, and is then connected with a directory assistance operator in a central office facility.

In such a system, the telephone company must then provide the directory assistance operator with an updated list of changes (additions and deletions) in the printed directory. Since many directory assistance calls require information regarding telephone numbers appearing in the printed directory, then the directory assistance operator must also have this information available. Further, in order to make this entire amount of information available to the directory assistance operator in a readily accessible form, the updated list must be integrated in some fashion with the printed directory information. This is usually done on an alphabetical basis, in the same manner as the annual printed directory.

Additionally, when a telephone subscriber's service is discontinued, most telephone companies are required to route any incoming calls for that disconnected number to an "intercept" operator, who advises the calling party that the number has been disconnected. If the subscriber has a new number, the intercept operator will then advise the calling party of that new number. In order to accomplish this, the intercept operator must also be provided with an updated list of discontinued numbers and the corresponding new number.

In order to provide the updated directory assistance and intercept operator lists referred to above, many telephone companies have daily lists printed which are then picked up and distributed by messenger service. In telephone systems of any size, the logistics of such an arrangement becomes quite burdensome.

Further, some telephone utilities have now been authorized by their respective public service commissions to charge for directory assistance calls where the called number is listed in the printed directory. The purpose of such a charge is to discourage the subscriber's reliance on the directory assistance operator in cases where the called number can be readily determined from the directory.

In some states, this authorization by the respective public service commission requires that the telephone company provide the directory assistance service free for each subscriber as to a limited number of directory assistance calls, the charge thereafter being only in effect after this threshold is reached. In such a situation, the telephone company may therefore determine three factors: first, the called number; second, whether the called number is actually printed in the most recent published directory; and finally, the calling number, so that an appropriate accounting as to the minimum number of free calls or charges beyond the number of free calls can be made. It has also been suggested that certain classes of subscribers, for example blind persons, be allowed to make an unlimited number of free directory assistance calls.

There are a variety of prior art patents that disclose telephone systems for intercepting calls and providing an input to the calling party with regard to the status of the called telephone number. In U.S. Pat. No. 2,899,503, Dubuar, discloses an automatically operated switching device for providing a machine announcement on intercepted calls.

Pharis, in U.S. Pat. No. 2,925,472, discloses an automatic arrangement similar to that taught by Dubuar.

In U.S. Pat. No. 2,968,700, Myers, discloses a telephone intercept system providing for intercept translation. Kezuka, in U.S. Pat. No. 3,586,780, discloses a system for automatically advising a calling party that the called telephone number has been changed and for advising him of the newly allotted number, if any.

SUMMARY OF THE INVENTION

The present invention contemplates a system and method for use with a telephone intercept or directory assistance operator position for providing an indication of the status of a preselected telephone number, a system including first means for storing data respresentative of the status of a plurality of telephone numbers, means collocated with the operator position for addressing the data storing means, and means also collocated with the operator position and the addressing means for receiving an output from the storing means and providing an indication of the status of that telephone number.

In a preferred embodiment, the system includes a second, redundant storage means which stores therein the data representative of the status of the telephone numbers, in a like manner as the first data storage means. A break-before-make switch is provided between the addressing means-indicating means combination and the first and second data storage means for switching between the two data storage means.

Further, the preferred embodiment of the present invention includes means for providing information to the storage means to indicate the called and calling party numbers, as well as means for indicating whether a credit or no charge condition exists within a particular call.

The system of the present invention, and the method incorporated therein, allows a directory assistance or intercept operator to determine the status of any telephone number by addressing the storage means and reading the information on a real time basis from the indication means, which may comprise a cathode-ray tube, for example. In a preferred embodiment, the addressing means and indicating means comprise a common input-output device.

THE DRAWING

DETAILED DESCRIPTION

Figure 1:
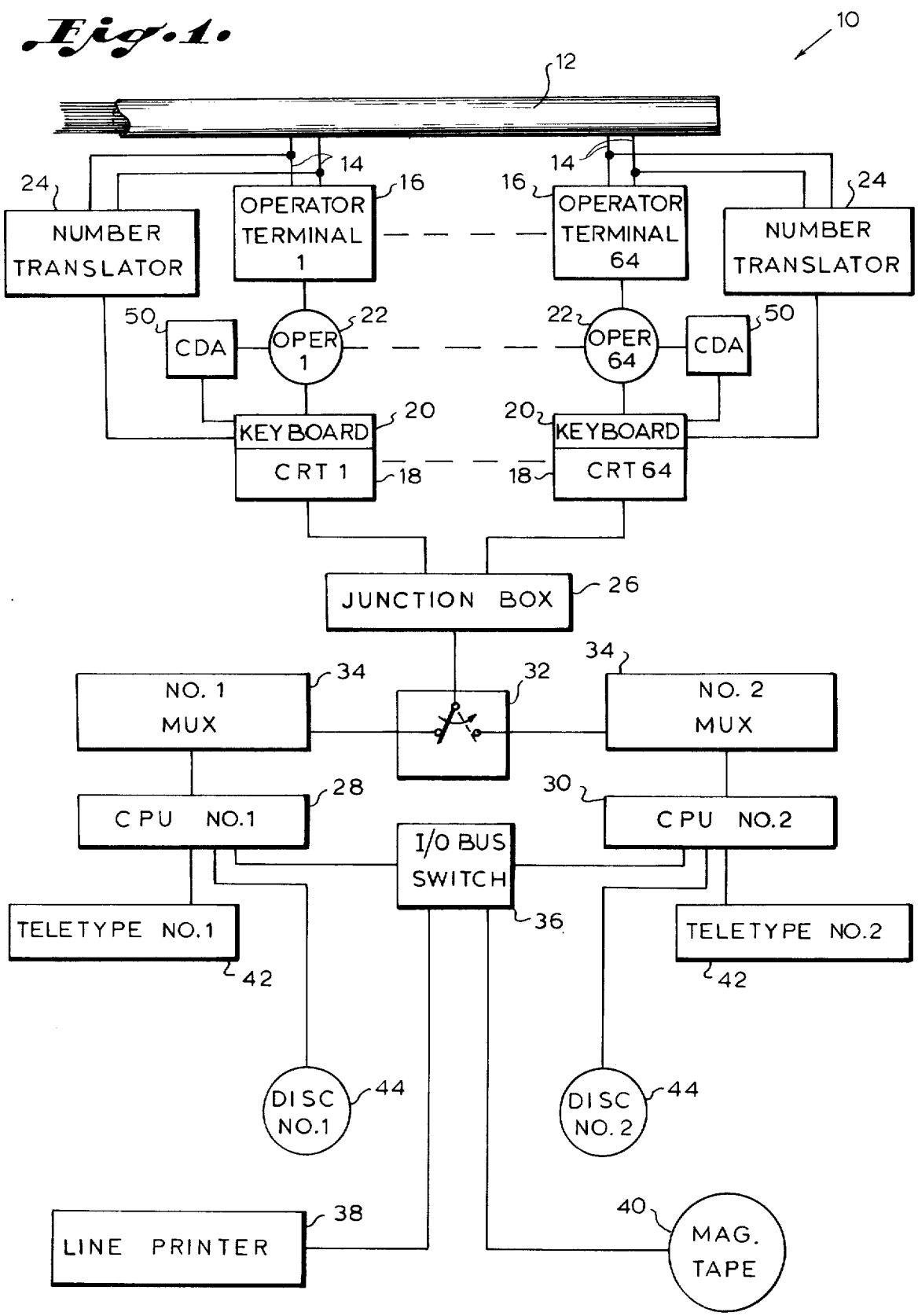
FIG. 1 is a block diagram illustrating one embodiment of the system in accordance with the present invention.

One embodiment of a system in accordance with the present invention, and the method incorporated therein, will be described with respect to the drawing.

The system of the present invention is referred to generally as 10, and is used in conjunction with a central telephone office facility having a cable trunk 12 and a plurality of line conductor pairs 14 each of which is fed into a corresponding operator terminal 16. In this preferred embodiment, 64 operator terminals 16 are contemplated, the first and sixty-fourth terminals actually being shown in the drawing, and the balance being depicted by a dotted line therebetween.

A common input-output device, which in this example comprises a cathode-ray tube terminal 18 having a keyboard 20 associated therewith, is collocated with each operator terminal 16. This cathode-ray tube-keyboard combination 18, 20 may comprise any common commercially available input-output terminal, such as the Hazeltine model 2000 manufactured by Hazeltine Corporation of Greenlawn, New York, for example. It will be understood that a directory assistance or intercept operator 22 is positioned between each of the terminals 16 and each keyboard 20 so as to receive messages (usually through a headset associated with the terminal 16), operate the keyboard 20 and thereafter converse with the calling part through the operator terminal 16, usually through a microphone associated therewith.

A number translator 24 may also be provided between each pair of line conductors 14 and each keyboard 20, in parallel with the operator 22 for providing an input to the keyboard 20 of line signals on the line conductors representative of the telephone number being called. A variety of number translator circuits are known in the prior art, and which are useful for the translator 24 shown in the drawing. For example, Bierman, in U.S. Pat. No. 3,399,279, discloses such an arrangement.

All of the common cathode-ray tube-keyboard combinations 18, 20 are coupled to a junction box 26 of conventional design. The system 10 further includes two central processing units 28 and 30. A common input from all of the cathode-ray tube-keyboard combinations 18, 20 through the junction box 26 is coupled to both of the central processing units 28, 30 through a switch 32 and a corresponding multiplexing circuit (MUX) 34. The central processing unit may comprise any one of a number of commercially available memory systems; for example, the Data General Model Nova 2/10 manufactured by Data General Corporation is suitable. Further, the multiplexing circuit 34, may comprise a Data General Model No. DCU-50, although any other multiplexing circuit compatible with the inputs from the keyboard 20 and the central processing units 28, 30 is suitable.

In accordance with the present invention, the switch 32 preferably comprises a break-before-make switch, such that when the input from the keyboard 20 is switched between the central processing units 28, 30, continuity is not maintained. A switch manufactured by Data General Corporation such as Model No. 5702 is suitable for use as the switch 32.

Each central processing unit 28, 30 is coupled through an input-output bus switch 36 to a line printer 38 and a magnetic tape drive 40, both of conventional design. Additionally, a teletype unit 42 is associated with each central processing unit 28, 30 as a means for providing new instructions to the corresponding central processing unit. Disc memory units 44 are likewise associated with each central processing unit 28, 30.

Figure 2:
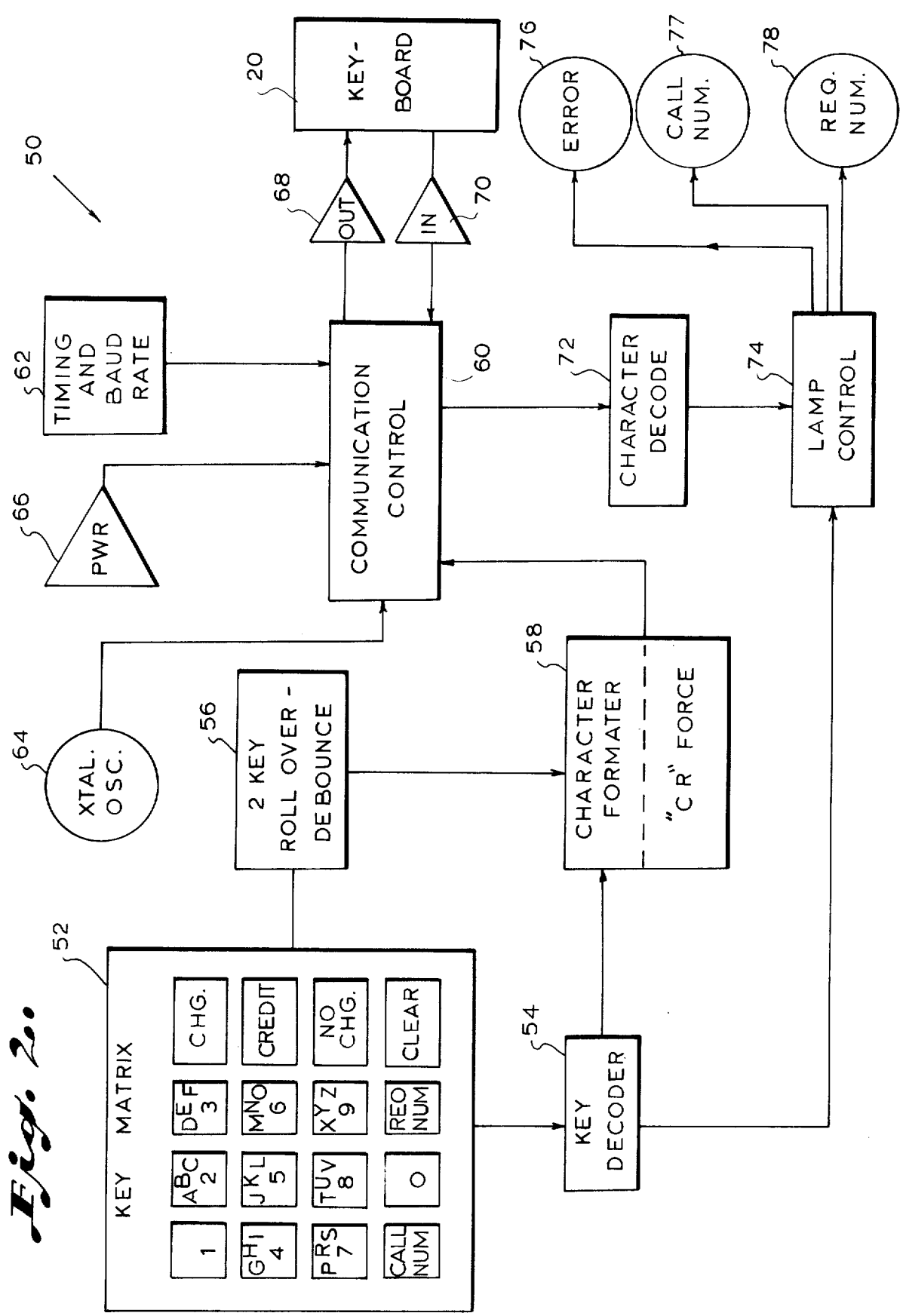
FIG. 2 is a block diagram illustrating a portion of the system of FIG. 1.

An additional feature of the system 10 of FIG. 1 includes a charge directory assistance circuit 50, which is more fully described with reference to FIG. 2.

The charged directory assistance circuit 50 includes a 16 key matrix, including 10 numerical keys 1-0. Additionally, the key matrix 52 includes six special purpose keys which are identified by the following legends: calling number key CALL NUM; requested number key REQ NUM; charge key CHARGE; credit key CREDIT; no charge key NO CHG; and a clear key CLEAR. Each of these keys provides an electrical input to a key decode circuit 54 of standard design, each of the keys having a function which will be described more fully below with respect to the operation of the circuit 50.

The decoded output from the key decode circuit 54 is fed into a character formatter and carriage return force circuit 58. Additionally, a direct output from the key matrix 52 is fed into a two key roll over and debounce circuit 56 of standard design, which includes logic to pick up two keys when hit close together, and to differentiate between those two keys. This information is fed into the character formatter circuit 58, so as to "clock" the output of that circuit with respect to a particular key being struck.

The character formatter and carriage return force circuit 58 is of a standard design which serves two functions. First, the formatter portion of the circuit 58 places the output of the key decode circuit 54 in a format compatible with the communication control circuit 60, described below. Second, the carriage return force portion of the circuit 58 sends a carriage return signal when one of the four special purpose function keys CHARGE, CREDIT, NO CHG and CLEAR described above are struck, indicating the end of the message, and allowing each of these keys to serve as an automatic entry key for the data being entered into the central processing unit 28 or 30.

The communications control circuit 60 is of a standard circuit design utilized for converting parallel data to serial data in an output direction, and converting serial information to parallel data in an input direction. Note that the output of the communication control circuit 60 is fed through a buffer circuit 68 and into the keyboard 20, while the input from the keyboard to the communication control circuit 60 is fed through a buffer 70 from the keyboard 20.

The circuit 50 is also provided with a standard timing and baud rate circuit 62, an oscillator circuit 64 and a power supply 66. Further, a character decode circuit 72 is provided to receive an output from the communication control circuit 60, and to energize a lamp control circuit 74 in conjunction with an output from the key decode circuit 54. The lamp control circuit 74 operates three lamps 76, 77 and 78. The call number lamp 77 is energized responsive to the striking of the call number key of the key matrix 52, while the requested number lamp 78 is correspondingly lit when the requested number key of the matrix circuit is struck. The error lamp 76 is lit at such time when an incorrect sequence of keys is hit on the matrix circuit 52, in a manner more fully described below with respect to the operation of the circuit 50.

Operation of the system 10 will now be described with reference to FIGS. 1 and 2. Initially; each central processing unit 28, 30 is programmed with redundant information regarding the status of each telephone number in the telephone company's area of service. This stored data bank may then be updated on a daily, or more frequent basis in order to establish a current data base representative of the status of all of the telephone numbers. Of course, this data base will not only include the telephone numbers, but will also include the name of the telephone subscriber associated with each number and the corresponding address.

In use, directory assistance or intercept telephone numbers are routed through the trunk 12 and to a selected operator terminal 16 via one pair of line conductors 14. The operator 22 then responds to the call in a normal fashion, and then addresses the data storage bank by utilizing the keyboard 20 to either type in the name of the person for whom directory assistance is requested, or the telephone number in the case of an intercept call. This addressing signal is then fed through the junction box 26, switch 32 and to the selected central processing unit 28 or 30 via the corresponding multiplexing circuit 34. On a real time basis, the central processing unit then provides a feedback signal to the cathode-ray tube terminal 18, which displays an indication of the status of the listing or telephone number requested by the operator 22. The operator 22 then advises the calling party of the information requested.

Operation of the charged directory assistance circuit 50 of the system 10 will now be described. Initially, when the operator receives a request for directory assistance, the operator asks the subscriber the number from which the call is being placed. Upon receipt of this number from the subscriber, the operator depresses the CALL NUM key, followed by the key sequence representative of the calling number. The operator then goes through a normal directory assistance operation, utilizing the cathode ray tube 18 and keyboard 20 terminal, as described above. After the requested number is obtained from the cathode ray tube, the operator then strikes the REQ NUM key of the key matrix circuit 52, and thereafter sequentially enters the numerical designation of the requested number. As described thus far, the information inserted into the communication control circuit 60 from the key matrix 52 via the decode and formatter circuits 54 and 58 comprises a single message, instructing the appropriate central processing unit 28 or 30 to note that a request for directory assistance has been made by the calling number, and for the particular requested number. Thereafter, to terminate this particular message, the operator strikes one of the four remaining special keys to instruct the central processing unit 28 or 30 as to the disposition of the particular directory assistance call. For example, if the CHG key is struck, the carriage return force function of the circuit 58 terminates the message and advises the central processing unit 28 or 30 that a charge is to be made to the calling number for this directory assistance service (or alternatively, to determine whether that calling number is within the number of free calls authorized during a given time period, in the manner described above). Alternatively, the operator may strike the CREDIT, NO CHG or CLEAR keys.

The lamp control circuit 74 and the appropriate lamps are lit to indicate to the operator the present status of the message; for example, when the CALL NUM key is struck, the lamp 77 is lit, followed by the illumination of the REQ NUM light 78 when the corresponding key is struck. If either of the keys are struck out of sequence during any given message, then the error lamp 76 is lit. In this manner, charged directory assistance is entered into the central processing unit 28 or 30 in an extremely facile manner.

It will be understood by those skilled in the art that when the operator 22 is serving as an intercept operator, or when entering the calling number for directory assistance charging, then the input signal of the calling telephone number through the line conductors 14 may be automatically fed through the number translator 24 into the keyboard 20, thus serving as an input to the central processing unit 28 in the manner described above. Alternatively, the number translator 24 may serve as a permanent parallel installation with the operator 22, so as to function for intercept calls, when the operator 22 is serving a dual function as both an intercept operator and a directory assistance operator.

The system of the present invention clearly avoids the problems heretofore experienced and provides an updated list of directory assistance and intercept information for operator purposes. Most importantly, the use of redundant central processing units 28, 30 provide a degree of redundancy that allows one unit to be employed for purposes other than are directly related with the intercept/directory assistance operator needs and allows "on-line" programming without down-time. Further, this redundant unit may be employed as a data base for preparation of the annual printed directory.

Additionally, in those areas where regulatory agencies have allowed a customer charge for directory assistance-class of service, it will be understood that the use of the system 10 in accordance with the present invention provides a basis for computing such charges on an automatic basis.

We claim:

1. A system for use with a telephone intercept or directory assistance operator position for providing an indication of the status of a preselected telephone number, such system comprising:
    first means for storing data representative of the status of the plurality of telephone numbers;
    means collocated with said operator position for addressing said data storing means;
    means collocated with said operating position and said addressing means for receiving an output from such storing means and providing an indication of the status of said telephone number;
    second means for storing data representative of the status of said plurality of telephone numbers; and
    means for switching said addressing means and said indicating means between said first and second storing means.

2. A system as recited in claim 1 wherein said addressing means and said indicating means comprise a single input-output device.

3. A system as recited in claim 1 wherein said addressing means comprises a keyboard.

4. A system as recited in claim 3 wherein said indicating means comprises a cathode-ray tube terminal.

5. A system as recited in claim 1 wherein said switching means comprises means for breaking a circuit connection of said addressing means and said indicating means to one of said first and second storing means prior to making a circuit connection of said addressing means and said indicating means to the other of said first and second storing means.

6. A system as recited in claim 5 further comprising multiplexing means between said switching means and each of said first and second storing means.

7. A system as recited in claim 5 further comprising:
a plurality of said addressing means and a plurality of said indicating means, each combination of one of said addressing means and one of said indicating means being collocated with another operator position;
means for routing inputs from all of said addressing means through said switching means; and
means for routing outputs from said first and second storing means to all of said indicating means through said switch means.

8. A system as recited in claim 5 further comprising an intput-output bus switch coupled to both of said data storing means.

9. A system as recited in claim 8 further comprising a line printer coupled to both said data storing means through said bus switch.

10. A system as recited in claim 7 further comprising a magnetic tape driver coupled to both said data storing means through said bus switch.

11. A system as recited in claim 5 further comprising means for inputting said telephone number status data into each said data storing means.

12. A system as recited in claim 1 further comprising means for inputting a message to said data storage means representative of a calling number, and a charge directory assistance status.

13. A system as recited in claim 12 wherein said message inputting means comprises a key matrix having a plurality of numerical keys and a plurality of instruction keys.

14. A system as recited in claim 13 further comprising means for terminating said message responsive to activation of one of said instruction keys.

15. A system as recited in claim 14 further comprising means coupled with said inputting means for indicating the status of said message prior to termination thereof.

16. A system for use with a plurality of telephone operator positions, each operator position having means for monitoring a plurality of line conductor pairs, said system including means for providing an indication of the status of a plurality of telephone numbers, said system comprising:
first means for storing data representative of the status of the plurality of telephone numbers;
second means for storing data representative of the status of said plurality of telephone numbers;
means collocated with said operator position for addressing said first and second data storing means;
means coupled between each said line pair and said addressing means and providing an input to said addressing means representative of each call telephone number through said line pair;
means collocated with said operator position and said addressing means for receiving an output from one of said storing means and providing an indication of the status of said telephone number; and
means for switching said addressing means and said indicating means between said first and second data storing means.

17. A system as recited in claim 16 wherein said switching means comprises means for breaking a circuit connection of said addressing means and said indicating means to one of said first or second storing means and making a circuit connection of said addressing means and said indicating means to the other of said first or second storing means.

18. A system as recited in claim 17 wherein said addressing means and said indicating means comprise a common input-output device.

19. A method for use in a central telephone office facility of the type having a plurality of telephone operator positions, said method comprising the steps of:
providing first and second data storing means, each capable of storing data representative of the status of the plurality of telephone numbers;
addressing one of said first or second data storing means with respect to a preselected telephone number;
providing an indication at the operator location of the status of said preselected telephone number as an output of one of said data storing means; and
switching from one of said storing means to the other of said storing means, but after breaking a circuit contact with the one of said data storing means being switched from.

* * * * *